(12) United States Patent
Dytko et al.

(10) Patent No.: US 11,290,520 B1
(45) Date of Patent: Mar. 29, 2022

(54) VIDEO AND AUDIO DEMULTIPLEXING FROM A FILE STORED IN A REMOTE STORAGE MEDIUM

(71) Applicant: Amazon Technologies, Inc., Seattle, WA (US)

(72) Inventors: Thomas Jason Dytko, Portland, OR (US); Michael James Henry, Damascus, OR (US); David Scott Montgomery, Portland, OR (US); Ryan Paul Hegar, Happy Valley, OR (US)

(73) Assignee: Amazon Technologies, Inc., Seattle, WA (US)

( * ) Notice: Subject to any disclaimer, the term of this patent is extended or adjusted under 35 U.S.C. 154(b) by 1167 days.

(21) Appl. No.: 15/083,198

(22) Filed: Mar. 28, 2016

(51) Int. Cl.
  *H04L 29/08* (2006.01)
  *H04L 67/06* (2022.01)
  *H04L 67/1097* (2022.01)
  *H04L 67/568* (2022.01)

(52) U.S. Cl.
  CPC .......... *H04L 67/06* (2013.01); *H04L 67/1097* (2013.01); *H04L 67/2842* (2013.01)

(58) Field of Classification Search
  CPC .. H04L 67/06; H04L 67/1097; H04L 67/2842
  USPC ........................................................ 709/219
  See application file for complete search history.

(56) References Cited

U.S. PATENT DOCUMENTS

| | | | | |
|---|---|---|---|---|
| 5,594,491 A | * | 1/1997 | Hodge | H04N 7/17336 348/E5.008 |
| 2004/0162885 A1 | * | 8/2004 | Garg | G06F 17/30575 709/213 |
| 2014/0013027 A1 | * | 1/2014 | Jannyavula Venkata | G06F 12/0866 711/103 |
| 2014/0281001 A1 | * | 9/2014 | Harrison | H04L 65/607 709/231 |
| 2015/0281288 A1 | * | 10/2015 | Levinson | H04L 47/41 709/219 |

* cited by examiner

*Primary Examiner* — Vivek Srivastava
*Assistant Examiner* — Hien V Doan
(74) *Attorney, Agent, or Firm* — Davis Wright Tremaine LLP

(57) ABSTRACT

A first set of blocks is caused, by a first computer system, to be downloaded from a file located on a second computer system. A second set of blocks to download from the file is identified, based at least in part on the first set of blocks. A subset of the second set of blocks that are not in a cache of the first computer system are determined. For each determined block in the subset, an available thread is assigned from a thread pool to the determined block, the available thread is caused to download, in concurrence with blocks being downloaded by threads assigned to other determined blocks of the subset, the determined block from a second computer system into the cache of the first computer system.

20 Claims, 9 Drawing Sheets

VIDEO AND AUDIO DEMULTIPLEXING FROM A FILE STORED IN A REMOTE STORAGE MEDIUM

BACKGROUND

Increasingly, high-resolution media, such as video and audio, is being streamed from remote websites, and consumed by users through their electronic devices. However, because transcoding of the media typically cannot start until the entire file is downloaded, users can experience undesirable delay before they are able to view or listen to the media. Furthermore, because storage space on some computing systems is at a premium, downloading of large files to local storage can tax the local resources of the computing system. Still further, if different data types are multiplexed in the same media file, it can be difficult to demultiplex and transcode the data while it is being downloaded.

BRIEF DESCRIPTION OF THE DRAWINGS

Various techniques will be described with reference to the drawings, in which.

DETAILED DESCRIPTION

Figure 1:
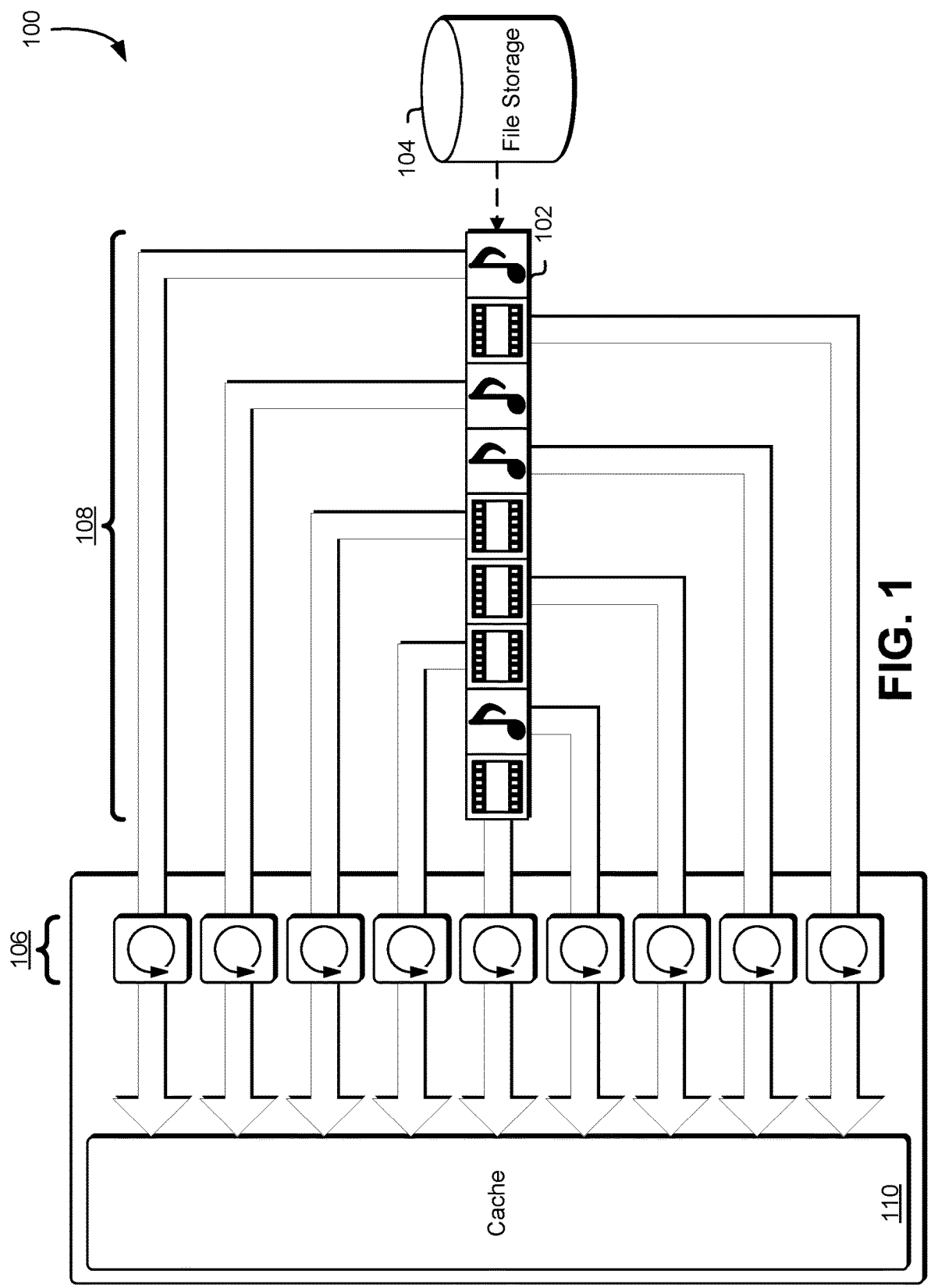
FIG. 1 illustrates an example of a progressive downloader in accordance with an embodiment.

This disclosure relates to systems and methods for providing an interface, similar to a file handle, that provides access (e.g., open, close, read, seek, and tell operations) to a file using the same interface regardless whether the file is stored on a local file system, a network mount, or stored remotely. Multiple of these interface instances can be accessing different parts of the same file at the same time, with each interface keeping track of its own read position within the file. If the file is stored remotely, parts of the file may be downloaded to the local file system/cache in fixed-size blocks, the size of which may be user-configurable.

The cache may use a least recently used policy for managing the eviction of the fixed-size blocks as needed. The cache may also utilize a pool of threads for performing the block downloads, and the threads may be configured to retrieve multiple blocks in parallel in order to optimize data transfer and keep pace with transcoding operations. The depth of parallelism may be controlled by a read-ahead value, which may also be user-configurable, that affects which and how many blocks should be downloaded in anticipation of upcoming demand for their content. For any of the read-ahead blocks not already in cache, read-ahead threads (up to the read-ahead value or other threshold maximum) may be assigned or spawned to retrieve, in parallel as needed, the read-ahead blocks into cache.

Thus, techniques of the present disclosure include, in response to receiving a first request for a first amount of content from a media file stored at a file storage location, determining, based at least in part on the first request, a first block of the content and a second block of the content not present in a local cache, producing a first transcoded block by obtaining, using a first thread of a set of threads, the first block from the media file, and demultiplexing and transcoding the first block to produce the first transcoded block. In concurrence with obtaining the first block using the first thread, the techniques include obtaining and demultiplexing, using a second thread of the set of threads, the second block from the media file, storing the second block in a local cache, and providing the first transcoded block in response to the first request. Subsequently, in response to receiving a second request for a second amount of content from the media file, techniques include obtaining a second block from the local cache, transcoding the second block to produce the second transcoded block, and providing the second transcoded block in response to the second request.

Techniques described and suggested in the present disclosure improve the field of computing, specifically the field of media streaming, by allowing a media file to be demultiplexed and transcoded progressively before the full file is downloaded to local storage. Additionally, techniques described and suggested in the present disclosure optimize media streaming by parallelizing downloads in order to reduce the time required to download media, efficiently use available bandwidth, and reduce the amount of space needed in local storage for storing downloaded media. Moreover, techniques described and suggested in the present disclosure are necessarily rooted in computer technology in order to overcome problems specifically arising with computing devices having limited storage space available for media download by downloading, demultiplexing, and transcoding only portions of a media file as they are needed.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example embodiment 100 of the present disclosure. Specifically, FIG. 1 depicts a file 102, such as a multimedia file, being downloaded in blocks 108 by parallel threads 106 from file storage 104 to a cache 110. The file 102 may be a file stored in the file storage 104 having one or more types of media interleaved within the file. Although the file 102 is depicted as a single file, it is contemplated that the parallel threads 106 may be downloading blocks in parallel from multiple files. As one example, video may be stored in a first multimedia file and audio for the video may be stored in a second multimedia file. As another example, the system of the present disclosure may be downloading two videos simultaneously.

Although the example embodiment 100 depicts the blocks 108 of the file 102 being downloaded sequentially, embodiments of the present disclosure support downloading of blocks of data from the file 102 in any sequence including in a random access manner. For example, a first block being downloaded by a first thread may correspond to data in the middle of the file 102, a second block being downloaded by a second thread may correspond to a block towards the beginning of the file 102, a third block being downloaded by a third thread may correspond to a block towards the end of the file 102, and so on.

The blocks 108 may be a portion of the file 102 starting at a particular offset in the file 102 and extending a range of bytes corresponding to a block size. In embodiments, the block size is configurable by a user and/or computing resource service provider. Although the blocks 108 are depicted with equal block sizes and each block is depicted as a separate media type (e.g., video or audio), this is for illustrative purposes only; it is contemplated that media types may overlap into adjacent blocks and that blocks may contain a single media type or a mixture of any number of different media types. Furthermore, although FIG. 1 depicts only two types of media in the file 102, video and audio, it is contemplated that the file 102 may include various other types of data, such as text (e.g., subtitles in various languages), data tables, and other metadata about the file 102. The blocks 108 may include blocks containing content specifically requested by a computing device at the direction of a user, and may also include read-ahead blocks that are being downloaded to the cache 110 in anticipation of their demand in the near future.

The file storage 104 may be a repository for data objects, such as database records, flat files, and other data objects. Examples of file storage includes file systems, relational databases, non-relational databases, object-oriented databases, comma delimited files, and other files. The file storage 104 may be a data store hosted by a data storage service provided by a computing resource service provider to its customers. In some implementations, the file storage 104 is a distributed data store.

The parallel threads 106 may be computer instructions configured to, upon execution by one or more processors, download blocks of data from the file 102 to the cache 110. Each of the parallel threads 106 may download a separate block of data from the other parallel threads 106. The parallel threads 106 may execute in parallel through context switching or may simultaneously be executed by separate processor cores. The parallel threads 106 may be members of a thread pool, and idle threads from the thread pool may be assigned to download the blocks 108 as needed, if the blocks 108 are not already stored in the cache 110. As each of the parallel threads 106 completes its download of its respective block, the parallel threads may return to the thread pool as an available thread. The cache 110 may be memory or persistent storage, or a combination of the two, used for temporary storage of the blocks 108 in anticipation of future requests for data within the blocks 108 so that they can be quickly served to the requestor without having to re-download them from the file storage 104. In some embodiments, the cache 110 operates according to a least recently used policy such that more-recently used blocks will replace least recently used blocks as needed.

Techniques of the present disclosure provide access to files in a manner such that it is transparent to the user whether the files, at the time they are requested, are located in the cache 110, located on a local file system, or located in remote storage. Furthermore, techniques of the present disclosure may allow portions of the file 102 to be fetched, as needed, from the file storage 104 without fetching the entire file; thereby reducing the local storage space needed for storing the file 102. Additionally, if the file type of the file 102 is such that it is typically accessed sequentially, techniques of the present disclosure may improve performance by reading sequential blocks of the file 102 ahead of the requested block, thereby increasing the likelihood that, when the read-ahead block is needed, it will already be present in the cache 110. This pre-fetching, in some embodiments, is performed in parallel such that each block could be downloaded by a separate thread, thereby optimizing download performance.

The file 102 may be effectively segmented into the blocks 108 of a predetermined size and downloaded from a file storage location to the cache 110 a block at a time. In some embodiments the block size is configurable. The "input data interface," as used in the present disclosure, may be a class presented to act as a standard file handle, and may support operations like opening the file 102, closing the file 102, seeking to a position in the file 102, or reading from the file 102. That is the interface may act as a file handle that provides access (e.g., open, close, read, seek, and tell operations) to a file, regardless whether the file is stored on a local file system, a network mount, or stored remotely. Multiple instances of these interfaces may access different parts of the same file at the same time, with each interface keeping track of its own read position within the file. If the file is stored remotely, parts of the file may be downloaded to the local file system/cache in fixed-size blocks, the size of which may be user-configurable. The interface of the present disclosure may be utilized, by the user, to access a file stored locally, in remote storage, a network mount, or in cache; i.e., the user or other requesting entity may just specify the URI for the file and the content requested, and the interface is configured to fetch and cache it from the location specified by the URI, whether that location is stored locally, stored in remote storage, or stored on a network mount. The interface may also be configured to perform pre-fetching whereby a predetermined number of the blocks 108 may be fetched from a file storage location to the cache 110 in anticipation that the content that they contain will be requested in the near future.

The system of the present disclosure may be impartial as to the type (e.g., video, audio, etc.) of data that it is fetching. For example, a media file could be interleaved with both audio and video data, but the system of the present disclosure may download and process blocks of video data in parallel with and independent from blocks of audio data being downloaded and processed from the same file. It should be noted, that the system of the present disclosure can be downloading separate files in parallel (e.g., a video file and one or more audio files being accessed and downloaded separately) and/or can be downloading separate portions of a same file in parallel (e.g., downloading, in blocks, a video content from a video file and downloading a number of read-ahead blocks of video from the same video file in parallel). The files accessed by embodiments of the present disclosure need not be stored in any particular format; for example, the system of the present disclosure supports Moving Picture Experts Group (MPEG) transport stream format, MPEG-4 (MP4) format, Hypertext Transfer Protocol (HTTP) live streaming format, and so on.

Fetched blocks may be stored in the cache 110 utilizing a least recently used policy. In this way, the entire file need not be stored locally (having an effect of saving local storage space) with minimal impact to performance because the blocks 108 in most demand will be likely to be found in the cache 110. In some media files, audio, video, and other data types may be combined (i.e., multiplexed) in an interleaved fashion within the same file. For example, a portion of the file 102 may contain audio, the next portion may contain video, the next portion may contain audio, followed by another portion of audio, followed by another portion of video, and so on, for different frames in time. Thus, when the file 102 or portions of the file 102 are received, they may need to be de-multiplexed in order to separate the data types.

As an example, if a video track is requested that is located at remote storage, the system of the present disclosure may begin by reading, as a first set of blocks, the first amount of video from the file 102 at remote storage. The system may also determine to download (i.e., prefetch) a number of read-ahead blocks (as a second set of blocks) in anticipation that they will also be needed. However, if the system ends up downloading a portion of an audio track, the system may also store that audio data in the cache 110. Upon receiving a request for the audio data, even if the request is made via a different file handle than the file handle downloading the video, the system of the present disclosure will recognize that the audio is already in the cache 110 and will retrieve the audio data from the cache 110. Thus, the system of the present disclosure may recognize whether data is in the cache 110 regardless of the requestor. In other words, if a first demultiplexer instance downloads some audio in the course of downloading bytes for video, it will put that audio data in the cache 110. If a second demultiplexer instance requests to fetch that audio data, it will be able to retrieve that audio data from the cache 110 without having to download those bytes from the file storage location. The cache 110 referred to in the present disclosure may be a shared local cache that is shared by the various instances of the interface of the present disclosure. Each block in the cache 110 may be indexed by its uniform resource identifier (of the source file) and its block number or offset location in the file 102.

Read-ahead may involve pre-fetching blocks of data of a predetermined size (e.g., byte offset) ahead of the current block (i.e., requested content) read offset. During prefetching, the system reads data without regard to the type of data. After the data is fetched, the data is then demultiplexed and the system determines which type of data was fetched.

Video data fetched may be compressed according to any of a variety of encoding formats. In some examples, an "encoding format" may be format in which the video or audio elementary streams are written and compressed, such as MPEG-2, H.264, High Efficiency Video Coding (HEVC), or Apple ProRes. Similarly, audio data may be uncompressed or compressed (e.g. using Advanced Audio Coding (AAC) or Dolby Digital formats). Note that a multiplexing or "packaging format" may refer to multiplexed file format that contains those elementary streams, such as an MP4 wrapper or transport stream wrapper. The demultiplexer is configured to demultiplex that outer packaging format to obtain the elementary streams. The decoder then decodes the elementary streams themselves. In the present disclosure, the term "encoding format" may also refer to packaging formats. So once data has been downloaded and demultiplexed, it may be further transcoded into an uncompressed format and/or re-encoded per a requesting user's specification. In some embodiments, uncompressed output may be then displayed on a screen of a user device. So, for example an MPEG-2 video may be downloaded and transcoded/re-encoded into H.264 format. As another example, an H.264 video may be downloaded and transcoded/re-encoded into H.264 but at a different bit rate (e.g., the video may have been scaled, etc.).

Embodiments of the present disclosure include a number of classes/methods for performing operations described in the present disclosure. An example of such a class includes InputData( ) which may provide a programmatic interface that has open, close, read, and seek methods. In this manner, InputData( ) can provide access to files using the same interface regardless whether the file 102 is stored on a local file system or stored remotely (e.g., accessible using Hypertext Transfer Protocol to a remote data storage service). Thus, InputData( ) may be considered an abstraction of a file handle, and multiple processes may utilize the file handle to access the same file. InputData( ) may include as a parameter a current position in the file 102 for reading. In downloading a remote file, InputData( ) may fetch parts of the remote file in fixed-sized blocks. It should be noted then, that descriptions of examples and embodiments in the present disclosure that referred to a remotely stored file are similarly applicable to the locally stored files and files stored on network mounts as to remotely stored files.

In many embodiments, the block size is configurable, such as in a configuration file or by the use of input settings. The blocks 108 that have been fetched from remote storage, a local file system, or network mount may be stored in the cache 110 of recently-used blocks. The cache 110 may use a least recently used policy or other eviction policy (e.g., for sequential block access, immediately discard used blocks sequentially) for managing the eviction of the blocks 108 from the cache 110 as needed. The cache 110 may have a thread and a message queue for receiving commands, such as the file cache thread 310 and the first message queue 316 illustrated in FIG. 3. The cache 110 may also include a pool of threads, such as the thread 308A-08M, for performing downloads of the blocks 108 from remote data storage, local file system, or network mount. The pool of threads may utilize a second message queue, such as the second message queue 318, for communicating and responding to requests to download content corresponding to the blocks 108.

In order to have enough data transfer throughput to keep up with the transcoding processes, given the higher latency associated with downloading a block from remote storage (or network mount or even the local file system) versus obtaining the block from the cache 110, some embodiments of the present disclosure are configured to retrieve the blocks 108 in parallel. That is, some embodiments have a read-ahead value that corresponds to a number of sequential blocks to read/download ahead in anticipation of a need for those blocks. Thus, when a block is requested from the cache 110, the cache 110 may check whether the requested block is in the cache 110 and may also check whether the specified number of read-ahead blocks are in the cache 110. For any of those blocks that are not already present, the parallel threads 106 of the pool of threads may begin retrieving blocks not present from the remote data storage, local file system, or network mount.

For improved performance, block retrieval from the remote data storage, local file system, or network mount may be performed using parallelism. For example, each block in the read-ahead range that is not present in the cache 110 may be assigned to an available thread in the thread pool, up to a maximum number of threads. Note that, in embodiments, the maximum number of threads may be user-configurable. In this manner, the number of the parallel threads 106 being used may be based on the read-ahead value. Furthermore, customizing the read-ahead value allows the user to control how many threads will be created in the thread pool by the cache 110. For example a maximum number of threads may be a number of InputData( ) instances multiplied by the read-ahead value. In some embodiments, the user may specify a maximum number of threads in the thread pool, and the system may compute a read-ahead value that allows the system to optimize performance while maintaining the number of active threads at or below the specified maximum number. In some of these embodiments, the system may include, as a factor in the computation of such read-ahead value, a bit rate and/or media type of the content being requested. For example, discounting other conditions, media having a higher bit rate may be assigned a higher read-ahead value than media having a lower bit rate. Moreover, in embodiments, the read-ahead value and/or number of available threads can dynamically fluctuate as needed to keep pace with the rate that non-speculative (i.e., requested) blocks are processed (e.g., transcoded).

A typical use case for the system of the present disclosure may be for downloading video with multiple language tracks (e.g., English, Spanish, etc.) and other metadata to a computing system where storage space is at a premium, such as a smart phone, a tablet, or a virtual machine with limited resources. In some examples, "computing system" may refer to both physical and virtual electronic devices. However, it is contemplated that the system of the present disclosure may be used in other contexts, such as for downloading from a file containing multiple programs of content that has been multiplexed together, even if different parts of the file 102 have been stored at different bit rates. The system is agnostic/indifferent as to what the actual multiplexed file format is, although the demultiplexing algorithms may be specific to the particular file formats. For example, in embodiments, the system may attempt to demultiplex the file by iterating through various demultiplexers until the demultiplexer that successfully demultiplexes the file is found.

The system of the present disclosure supports accessing the file 102 from remote storage, local file system, or network mount sequentially or in a random access manner. That is, the system may read the blocks 108 sequentially, or may access portions of the file 102 starting at a specified offset. In some implementations, the prefetching/read-ahead capability may be manually or dynamically enabled/disabled. That is, if the non-speculative data is not determined to be present in a local cache, the data may be fetched from the file 102; this "not determined" may include cases where the cache 110 is not checked for the data (i.e., the system does not make a determination whether the data is in cache or not), as well as cases where the cache 110 is checked, but the requested data is not found in the cache 110 (i.e., determined to be absent). That is, in some embodiments, the user can specify to non-speculatively fetch data from a particular file, and not fetch any read-ahead data. In some embodiments the system or user can specify that the data is to be fetched directly from the file 102, even if the data is already stored in the cache 110. In some examples, the term "speculative" reads/fetches may refer to reading or fetching data/blocks that the system determines (e.g., by a set of rules, a read ahead value, an algorithm, etc.) are likely to be requested within a certain time period subsequent to receiving an express request for data. Likewise, the term "non-speculative" reads/fetches may refer to reading or fetching data/blocks that have been expressly requested. Note that once the non-speculative data has been fetched as blocks, these non-speculative blocks may then be stored in cache.

In some embodiments, the read-ahead value can vary based on the type of data format. For example, certain audio content may have a smaller read-ahead value than certain video content; in such case, fewer blocks of the audio content may be read-ahead than the video content. Likewise, block sizes may vary based on type of data format. This could result in simultaneously downloading audio and video media, where audio content has a first block size and a first read-ahead value, and the video content has a second block size and a second-read ahead value. In this manner, a video track could be set to pre-fetch proportionately more or less than its corresponding audio track.

In some embodiments, the read-ahead value and block size can vary based on the type of file that the content is being downloaded from; for example, file types configured for sequential accesses might be associated with a larger read-ahead value than file types configured to be randomly accessed. Additionally or alternatively, in some embodiments the read-ahead value and/or block size can vary based on the bit rate of the media content being downloaded. In such embodiments, the maximum or minimum number of threads in the thread pool and/or number of network connections to the remote storage location or network mount can also vary based on the bit rate of the media content. Still additionally or alternatively, in some embodiments, the block size can vary based on the portion of the file 102 from which the content is being downloaded; for example, a smaller block size may be used for downloading portions of the file 102 used for indexing the file 102 versus portions of the file 102 used for video data. Furthermore, in some embodiments, the number of threads in the thread pool or number of network connections to the remote storage or network mount location may be dependent at least in part on a number of demultiplexers that have been instantiated.

Note that in some embodiments, the read-ahead value is user-configurable, such as through a configuration file, through an application programming interface, passed programmatically as a parameter, specified in a web user interface, etc.). Additionally or alternatively, in some embodiments, the size of the blocks 108 are user-configurable; that is, a user may specify (e.g., via an application programming interface, web dashboard, configuration file, etc.) how large each block of data downloaded to the cache 110 should be. Also additionally or alternatively, the user may specify, in a similar manner, how much space to use locally (e.g., size of the cache 110).

Figure 2:
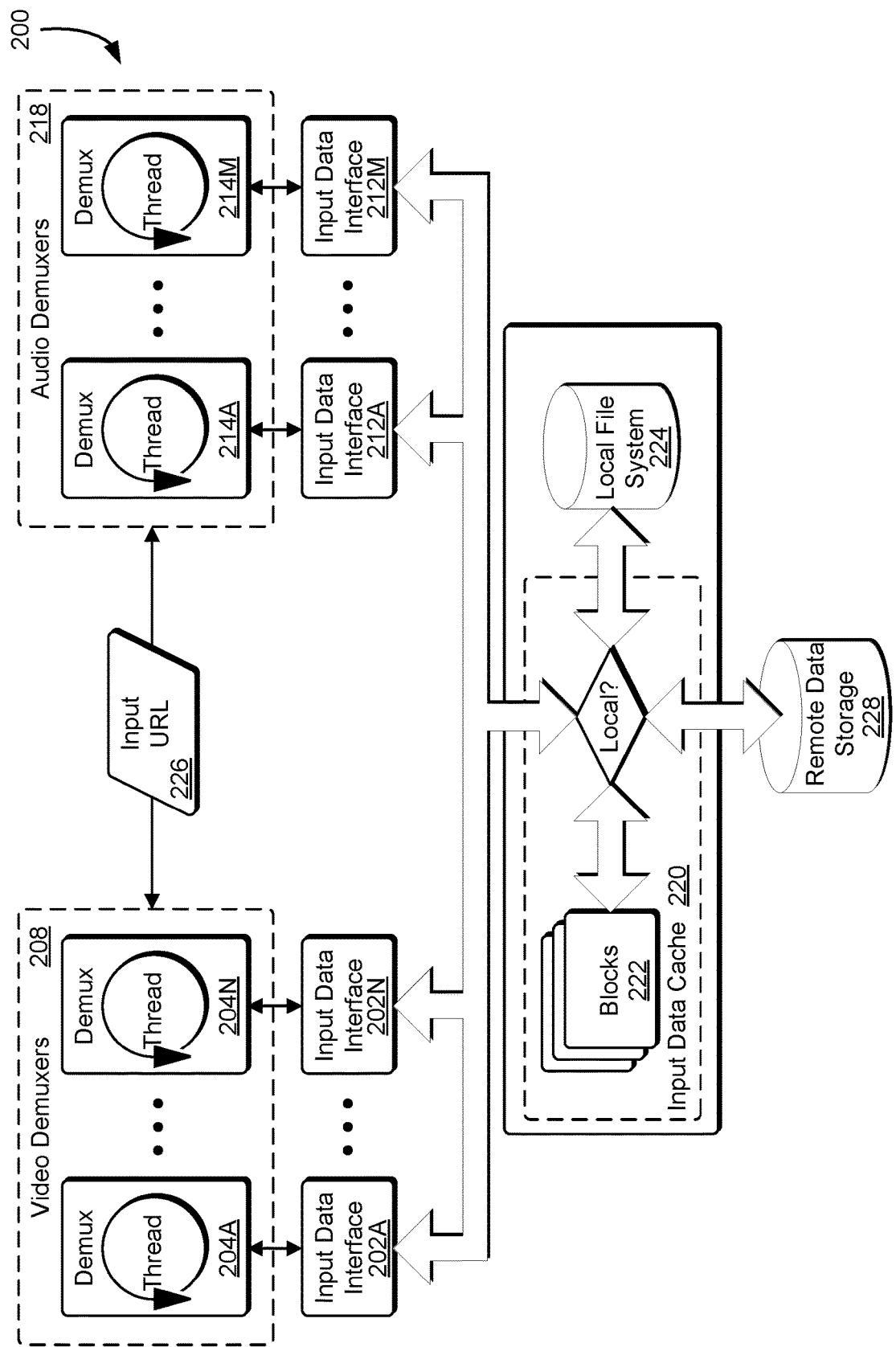
FIG. 2 illustrates an example of demultiplexers in accordance with an embodiment.

FIG. 2 illustrates an example embodiment 200 of the present disclosure. Specifically, the example embodiment 200 depicts a flow for processing video and audio streams, using demultiplexer threads 204A-04N and 214A-14M of video demultiplexers 208 and audio demultiplexers 218, respectively. Although the example case in FIG. 2 depicts multiple video demultiplexer threads 204A-04N and multiple audio demultiplexer threads 214A-14M, it is contemplated that the number and type of demultiplexer threads may vary based on the particular demands of users. For example, in a given scenario in response to a user request to receive a video, the system of the present disclosure may determine to use a single thread for processing the video and multiple threads for processing corresponding audio (e.g., in different languages for the video). Alternatively, the system of the present disclosure may determine to use multiple threads for the video (e.g., videos in multiple resolutions) and only a single thread for audio corresponding to the video.

The demultiplexer threads 204A-04N and 214A-14M may be threads from a thread pool of threads instantiated for downloading media content from a file stored on a network mount, from remote storage, or on the local file system. Each of the demultiplexer threads 204A-04N and 214A-14M may be assigned to process a request received from a file handle, which is represented by input data interfaces 202A-02N and 212A-12M, respectively. That is, the input data interfaces 202A-02N and 212A-12M may act as a file handle that provides an interface to the data being processed. When a block of data or a file is requested via the input data interfaces 202A-02N or 214A-14M, if the block of data or the file has already been fetched and stored locally, the input data interfaces 202A-02N/214A-14M provide access to the locally stored block of data from the blocks 222 stored in the input data cache 220 and/or the local file from the local file system 224 as needed.

A demultiplexer, also referred to as a file splitter, may be software that, when executed, demultiplexes different types of content (e.g., audio, video, subtitles, etc.) from a block of data, whereupon the different types of content can be sent to their respective decoders for decoding. It must be noted that the demultiplexers 208 and 218 are not decoders themselves, but may be sets of threads that separate different types of data contents. The example embodiment 200 depicts separate demultiplexers for video and audio.

The video demultiplexers 208 may be instructions that, when executed by one or more processors, cause a computing system to extract video components from a data stream or container. Similarly, the audio demultiplexers 218 may have instructions that when executed by the one or more processors, cause the computer system to extract audio components from a data stream or container. However, it is contemplated that in some implementations, the video and audio demultiplexers 208 and 218 may be combined such that each thread can demultiplex both video and audio. In addition, it should be noted that although FIG. 2 depicts video and audio demultiplexers, it is contemplated that the system of the present disclosure may be utilized for processing and/or demultiplexing other stream data besides video and/or audio. The demultiplexers 208 and 218 illustrate that there may be multiple threads fetching remote data. In some embodiments, multiple threads may be demultiplexing different parts of a file in parallel. One or more demultiplexers may be servicing each of the input data interfaces 202A-02N and 212A-12N. There may be different threads inside the cache that perform the fetch of the remote data.

In the example embodiment 200, if a demultiplexer completes processing of a local block, and a read-ahead value has been set, the input data interface may automatically fetch the next blocks, up to a number of blocks corresponding to the read-ahead value. However, if one or more of the next blocks have already been stored in the input data cache 220 (e.g., in blocks 222), those blocks need not be fetched. The blocks 222 may be chunks/portions of a data file located at the input uniform resource identifier (URI) 226 that have been downloaded by the demultiplexer threads 204A-04N and 214A-14M and stored in the input data cache.

The input data cache 220 may be utilized to cache the blocks 222. The caching scheme of the input data cache 220 may be a least recently used caching policy, some other caching policy, or a hybrid of a least recently used policy and some other policy. In a least recently used policy, the most recently accessed blocks in cache may be kept while the least recently used blocks may be discarded as the cache becomes full. In some embodiments, the blocks 222 of data stored in the input data cache 220 can be referenced by specifying the input URI 226 and a block number/identifier. In other additional or alternative embodiments, the blocks 222 of data stored in the input data cache 220 can be referenced by specifying the input URI 226 and a file offset. If requested data is not found in a block in the input data cache 220, the system of the present disclosure may obtain the block of data from its storage location in a remote data store, local file system, or network mount with a request indicating a file location for the block corresponding to the requested data and/or a byte range header for the block.

Once obtained, the block of data may be stored in the input data cache 220 with the blocks 222. The input data cache 220 may be responsible for responding to read requests and writing to the local file system 224. Data written to the local file system 224 by the input data cache 220 may be accessed by the input data interfaces 202A-02N and 212A-12M.

In the event the blocks 222 require more space than is available in random access memory, the blocks 222 may be stored in the local file system 224. Thus, the local file system 224 may be a system for non-transitory persistent (non-volatile) storage of data files, and may include a hard disk drive and/or other like storage media. The local file system 224 may include a database and/or a file structure, and, depending on implementation, may store individual blocks 222 or may store an entire downloaded file. Thus, the input data interfaces 202A-02N and 212A-12M support retrieving a file from either remote data storage 228, from the local file system 224 (e.g., stored on the local hard drive), or a network mount (not shown). In an event where the file is requested from the local file system 224, the example embodiment 200 may retrieve requested data directly from the local file, or may retrieve blocks 222 of data into the input data cache 220 in much the same way as if the blocks were being retrieved from the remote data storage 228. As noted, although not shown in FIG. 2, embodiments of the present disclosure may also support retrieving files from a network mount (e.g., network drive, etc.).

As illustrated in FIG. 2, an input data interface (e.g. one of the input data interfaces 202A-02N or 212A-12M) may request an amount of data. The input data cache 220 is checked to determine whether a block (or blocks) of data containing the amount of data requested is present within the blocks 222 or local file system 224. If present, the block may be provided to the requesting input data interface from the input data cache 220. Otherwise, the demultiplexer thread(s) servicing the input data interface request may download and demultiplex the requested data from the remote data storage 228 in the manner described in the present disclosure. The remote data storage 228 may be a data store or file system of a data storage service of a computing resource service provider. The input uniform resource identifier (URI) 226 represents a location in the remote data storage 228 where the media file can be found. The input URI 226 may be used, along with a block number, to index a downloaded block in the input data cache 220.

Figure 3:
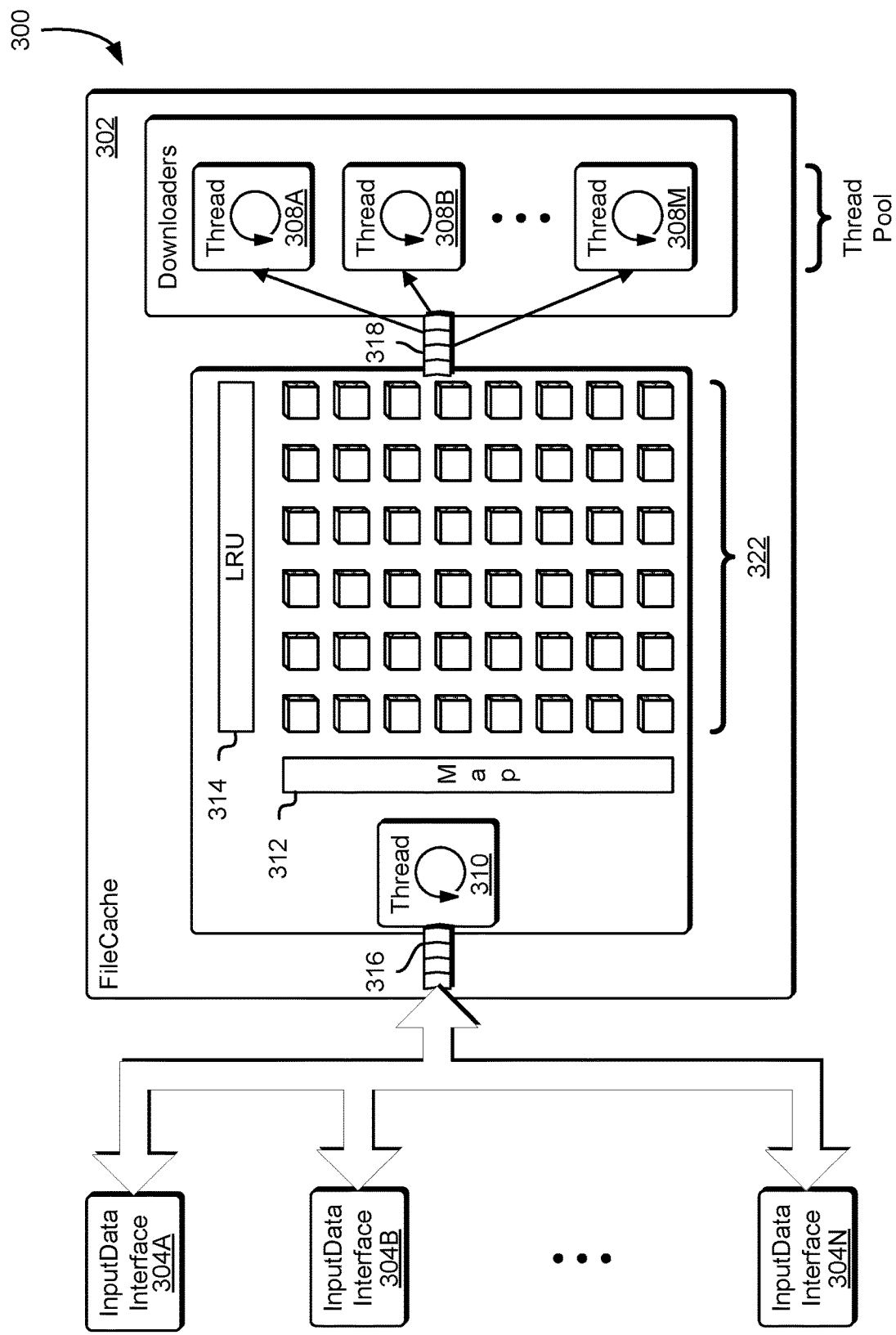
FIG. 3 illustrates an example of a file cache in accordance with an embodiment.

FIG. 3 illustrates an aspect of an embodiment 300 of the present disclosure. As illustrated in FIG. 3, the embodiment 300 includes one or more input data interfaces 304A-04N for communicating with the file cache 302. The file cache 302 may be similar to the input data cache 220 of FIG. 2. The file cache 302 may have a file cache thread 310 for servicing requests to read blocks 322 of data from cache. The file cache thread 310 of the file cache 302 may receive requests from the input data interfaces 304A-04N through the first message queue 316 on a first in, first out (FIFO) basis.

The input data interfaces 304A-04N may serve as file handles for the files being requested, whether the files are locally or remotely stored or in cache. Thus, the input data interfaces 304A-04N are indifferent as to the storage location of the file, whether it be remotely stored with the data storage service, locally stored in the file system, or on a network mount, and therefore the present disclosure may refer to these locations cumulatively as the "file storage location." The input data interfaces 304A-04N may be similar to the input data interfaces 202A-02N and 212A-12M of FIG. 2. Any of the input data interfaces 304A-04N may refer to the same or different block as another of the input data interfaces 304A-04N. In other words, each input data interface may keep track of its own read position within the file separate from the other input data interfaces, and read positions may overlap. For example, input data interface 304A may place a request in the first message queue 316 for a block that has a particular uniform resource identifier and block number, and, prior to being provided with the block, input data interface 304B may also place a request in the first message queue 316 for a block having the same particular uniform resource identifier and block number. In this example, the input data interfaces 304A-04B may be provided with copies of the same block from the file cache 302, if present, or from the file storage location if not.

In another scenario, input data interface 304A may request an amount of data, which is downloaded from the file storage location and stored in the file cache 302 under a least recently used policy 314 as the most recently used block. At a later time, the input data interface 304B may request and receive the same block, whereupon the block may be refreshed in the least recently used policy 314 as, once again, the most recently used block. In this manner, frequently-requested blocks (e.g., blocks containing file indexes) may be caused to stay in the file cache 302 longer than blocks which are only needed once, thereby improving performance.

In some cases, the amount of space allocated for the blocks 322 may be smaller than the entire size of the file. In this manner, blocks can be downloaded, processed, and discarded. However, some types of processing may require multiple passes. For example, media may be encoded in a dual-pass process such that a first pass may perform a preliminary transcode on the entire length of the content, and then on a second pass may perform a more thorough transcode using information obtained during the first pass. As a result, the blocks 322 may need to be decoded in multiple passes. In such cases, the configuration of the cache size may be set to a size large enough to hold the entire file, and the entire file may be then downloaded to the cache. In that way, the file may not need to be re-downloaded on a second or subsequent pass of processing.

Requests from the input data interfaces 304A-04B may be received into a first in, first out (FIFO) message queue 316 to the file cache thread 310. The file cache thread 310 may obtain requests from the first message queue 316 on a first in, first out basis for processing. The file cache thread 310 may be a thread that serves read requests from the input data interfaces 304A-04N. The file cache thread 310 may have access to a map 312 of the blocks 322 in the data structure of the file cache 302 and/or access to a least recently used policy 314 in order to locate and respond with the blocks 322 requested by the input data interfaces 304A-04N. If a requested block is not found in the blocks 322, the file cache 302 may submit a request to a second FIFO message queue 318 for the file. If there is a free thread in the threads 308A-08M of the thread pool, the free thread may obtain the request from the second FIFO message queue 318 and begin downloading the requested block from the file storage location. Once downloading is complete, the thread may then store the requested block in the file cache 302 among the blocks 322. In some embodiments, downloaded data may be provided directly to the requesting input data interface before the entire block has been downloaded so as to allow the requesting input data interface to use the data as soon as it is available. The file cache thread 310 may then provide the requested block to the requesting input data interface. Additionally or alternatively, in some embodiments, the requesting thread (e.g., one of the input data interfaces 304A-04B) may obtain the data directly from the file storage location rather than a thread from the thread pool 308A-08M; in such embodiments, the threads 308A-08M may be used primarily for fetching read-ahead (speculative) blocks.

The threads 308A-08M in the thread pool may be configured to download blocks of data from the file storage location, such as the remote data storage 228 or local file system 224 of FIG. 2. The thread 308A-08M may be configured to download blocks in parallel. However, in some embodiments, rather than multiple threads, the embodiments utilize multiple network (e.g., Hypertext Transfer Protocol) connections. For example, in such embodiments, segments of an HLS file would be downloaded using concurrent HTTP requests for the different segments.

The map 312 may be one or more tables used as an index to locate the blocks 322 in the file cache 302 and also to determine whether a requested block is present in the file cache 302. The map 312 may index the blocks 322 in any of a variety of ways such as by a uniform resource identifier of the file from which the block was retrieved and a block number usable to determine an offset corresponding to a location within the file from which the block was extracted. In embodiments, the file cache 302 is optimized to not download the same data more than once if it is stored within the blocks 322. In other words, if the file contains multiple types of media (e.g., video and audio) interleaved within the file, and a block of data obtained from the file and stored within the blocks 322 itself happens to contain multiple types of media, requests for data from the block may be fulfilled from cache regardless of the particular media type.

The least recently used policy 314 may correspond to a caching algorithm that discards least recently used objects first. The least recently used policy 314 may be a table or a stack from which an oldest block of the blocks 322 can be determined. It is contemplated, however, that other caching algorithms may be used, such as a most recently used policy, a pseudo-least recently used policy, a random replacement policy, a least-frequently used policy, and so on, in conjunction with or instead of the least recently used policy 314. For example, in an embodiment, in conjunction with another policy (e.g., least-recently used, most-recently used, etc.), in the course of determining which block to evict, the system may factor whether the block was ever fetched non-speculatively, or whether it was only ever fetched speculatively (e.g., blocks that have never been fetched speculatively may be weighed more heavily in favor of eviction, or vice versa).

In some embodiments, individual sub-blocks from within a block are stored in the file cache 302, and the individual sub-blocks can be independently evicted from the file cache 302. In these embodiments, the sub-blocks can be tracked using a bit field. For example, if each block is broken into 32 sub-blocks, then a 32-bit integer can be used to record which of those sub-blocks is still present in the file cache 302. In this manner, if various streams are interleaved within the block, but only a portion part of the block is needed for a second pass, re-downloading the data or portion can be avoided. In some of these embodiments, different types of data have different priorities, such that certain types of data with higher priority can be prevented from being evicted before types of data with lower priority are evicted.

As noted, the blocks 322 may be portions of a data file extracted from the data file starting at an offset through a number of bytes corresponding to a block size. In some embodiments, the block size is user-configurable. In other implementations, the block sizes may be dynamically varied based on content type (e.g., audio versus video). In some embodiments, block sizes may be particular to the requesting input data interface; e.g., input data interface 304A may cause data to be fetched in blocks of a first size and input data interface 304B may cause data to be fetched in blocks of a second size. Additionally or alternatively, in some embodiments, the user may specify a different fixed block size for each media URI. In addition, as noted, least recently used blocks may be discarded as the file cache 302 becomes full (or according to some other eviction algorithm).

Note that the embodiments of the present disclosure should not be so narrowly construed as to exclude uses of processing types of data beyond video and audio data. For example, the system of the present disclosure may be utilized to process large data sets having data that is typically accessed in a sequential order; e.g., any algorithm for processing data sequentially (e.g., data that is being received live/real-time) can be utilized in implementations of embodiments of the present disclosure. Likewise, the system may be utilized to process data associated with other access patterns. As an example, the system may be advantageous for processing files that are accessed "backwards" or "forwards" at speeds faster or slower than real time.

Figure 4:
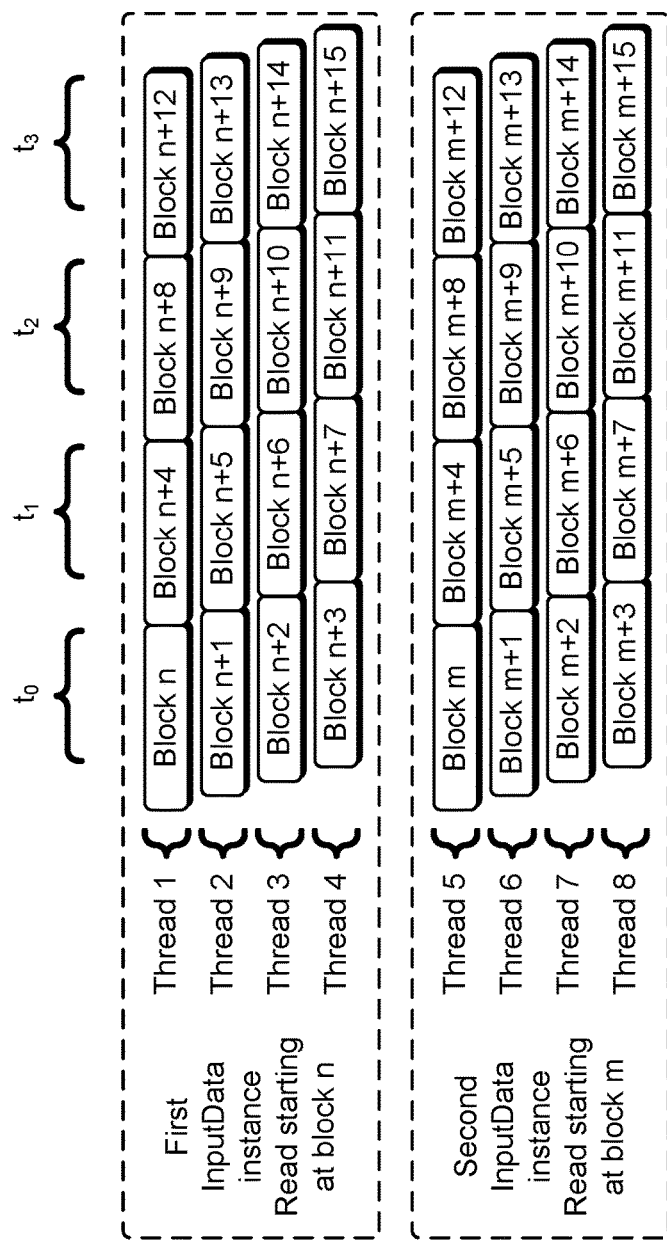
FIG. 4 illustrates an example of downloading blocks in parallel threads in accordance with an embodiment.

FIG. 4 illustrates an example 400 of reading ahead according to an embodiment of the present disclosure. Specifically, FIG. 4 depicts two InputData( ) instances concurrently downloading blocks using a read-ahead value of three. In some examples, the terms "concurrently," "concurrent," and "in concurrence" may refer to a state of two processes being executed at least partially simultaneously; that is, although the processes may not be synchronized, or necessarily start or finish at the same time, they may, for at least some period of time, be processed in parallel with each other. For example, at time t0 a first InputData( ) instance begins reading block n. Because the read-ahead value is set to three, three additional threads are provisioned to begin downloading blocks n+1, n+2, and n+3 in parallel with the thread downloading block n. In parallel with this, a second InputData( ) instance begins reading block m. Like the first InputData( ) instance, because the read-ahead value is set to three, three additional threads are provisioned to begin downloading blocks m+1, m+2, and m+3 in parallel with the thread downloading block m.

It may be that the first InputData( ) instance is downloading a video stream from a remote data server, while the second InputData( ) instance is downloading an audio stream that is synchronized with (or otherwise corresponds to) the video stream. However, this is just one of a variety of scenarios, other scenarios could include the first InputData( ) instance downloading a first video stream while the second InputData( ) instance is downloading a second video stream for a picture-in-a-picture display, the first InputData( ) instance downloading a first video stream while the second InputData( ) instance downloads higher resolution video stream of the same video, and so on. Furthermore, although FIG. 4 displays only two InputData( ) instances, it is contemplated that any number of instances may be downloading blocks in concurrence.

If the read-ahead block n+1 is requested (indicating that the read ahead was successful in predicting demand for the block n+1), because the read-ahead value is set to three, a thread may be automatically provisioned to begin downloading block n+4. If the request for block n+1 is still pending upon completion of the download of block n, that thread (thread 1) may be immediately assigned to download block n+4, and so on. Likewise if read-ahead block n+2 is requested, a thread may be automatically provisioned in the same manner to begin downloading block n+5, and so on. In this way, at time t1, blocks n+4, n+5, n+6, n+7, m+4, m+5, m+6, and m+7 may all be being downloaded concurrently. Likewise, at time t2, blocks n+8, n+9, n+10, n+11, m+8, m+9, m+10, and m+11 may all be being downloaded concurrently, and so on. This process may continue until the respective InputData( ) instances stop receiving requests for blocks or an end to the media file from which the blocks are being fetched is reached. It should also be noted that in some implementations, the read-ahead value may be different between InputData( ) instances. For example, the first InputData( ) instance's read-ahead value could be set to three, while the second InputData( ) instance's read-ahead value could be set to six, in which case, should enough threads be available, the second InputData( ) instance may have seven threads downloading in concurrence.

It is understood that some file formats, such as the HTTP Live Streaming (HLS) file format, may actually be a stream of data that is broken into multiple segments at different uniform resource identifier locations. Thus, pre-fetching in some embodiments of the present disclosure can be configured to fetch blocks from different uniform resource identifier locations. Furthermore, in some embodiments, a block size can be configured based on a size or number of HLS segments. For example, a block size may be determined based on an estimated HLS segment size (e.g., with some buffer added to ensure space for segment sizes larger than estimated). An estimate may be based at least in part on a size (in seconds) of the segment, the bit rate, and the resolution of the media. In an embodiment, the user may specify a block size, and the system may include additional space (e.g., 10%, 25%, 50%, etc.) for the actual block size, in order to reduce the risk of a segment being split into multiple blocks with a final block containing very little data.

Components of the system of the present disclosure may include InputData( ) which may act as an abstraction of a read-only file. InputData( ) may also track the current position in the file and allow seeks to different positions and reading of the file data into an output stream. The interface for InputData( ) may be of the form:

int64 Read(std::ostream& output, uint64 uNumBytes, Signal_t hCancel);

Read( ) may read, at most, uNumBytes bytes of data into output, blocking until it is done or until a cancel signal is received. On success, Read( ) may return the number of bytes actually read, which may be less than the amount requested if the end of the file is reached (e.g., after that, all reads may return zero). On error, Read( ) may return a negative value.

RetVal_t Seek(FileLocRef_t eOrigin, int64 iPos, Signal_t hCancel);

Seek( ) may set a position indicator associated with the stream to a new position, blocking until it is done or until a cancel signal is received.

int64 Tell(uint64& uOutPos);

Tell( ) may return a current file position relative to the beginning of the file. On error, Tell( ) may return a negative value.

RetVal_t GetStatistics(int& iNoInputMS) const;

GetStatistics ( ) may return some statistics associated with the data reads.

RetVal_t Cancel( );

Cancel( ) may be used to cancel a call to Read( ) For example, if a block size was chosen to be too large and speculative reads consumed too much resources as a result.

std::string GetURL( ) const;
std::string GetErrorMsg( ) const;
std::string GetName( ) const;
GetURL( ), GetErrorMsg( ), and GetName( ) may return a uniform resource locator for the file, a most recent error message, and the name of the file respectively.

FileInputData:public InputData

This implementation may provide access to a local file and may forward its methods to the equivalent application programming interface functions.

HTTPInputData:public InputData

In contrast, this implementation may provide access to a file accessible using Hypertext Transfer Protocol.

DSInputData:public InputData

This implementation may provide access to a file stored in a remote data store. This implementation may share code with HTTPInputData, but may add some specific headers for the data store and/or protocol translation.

CachedInputData:public InputData

This implementation may access the InputDataCache singleton to retrieve a cache block that is stored as a file on the local file system. This implementation may store the current block internally in order to efficiently service reads of the block. When the end of the block is reached, the next one may be requested from the cache.

InputDataFactory( ) may create the appropriate InputData type based on the protocol, passing in the needed parameters when constructed. The interface of InputDataFactory( ) may be of the form:
    static std::unique_ptr<InputData> Create(const Protocol::Type eProtocol, const std::string& strURI, const std:: string& strInterface, const std::string& strUsername, const std::string& strPassword, int32 iNumRetries, int32 iRetryInterval, uint32 uTimeoutSec, unsigned uNumReadAheadBlocks=InputNumReadAhead(    ), bool bUseCache=true);

InputDataCache( ) may have a most recently used (MRU) set inside which allows fast look ups based on the uniform resource identifier/block number pair to find a locally-stored block object. The MRU set may have an MRU list tracking when each block was last accessed, which allows quick eviction of the oldest blocks when the cache becomes full. When a Fetch( ) is done in the cache, a check may be made to determine whether the block needed is already in the cache. If so, then the block is returned. If not, then a request is made to an internal thread pool to download that block. The interface of InputDataCache( ) may be of the form:
    using                InputDataBuilder=std::function<std:: unique_ptr<InputData>( )>;
    std::future<std::unique_ptr<InputData>>  FetchBlock (const std::string& strURI, uint64 uStartByte, Input-DataBuilder inputBuilder);
    void ReadAhead(const std::string& strURI, uint64 uStartByte, uint64 uNumBytes, unsigned uNumReadAheadBlocks, InputDataBuilder inputBuilder);

The MRU set may be a data structure that can be indexed by a key for fast lookups, but internally may also be accessed in an MRU manner, so that the oldest entries can be deleted when the data set grows too large. The MRU set may be implemented using a boost::multi_index_container. The structure of the MRU set may be of the form:
    template<class T,
        class Hash=boost::hash<T>,
        class Pred=std::equal_to<T>,
        class Alloc=std::allocator<T>> class MRUSet
{
public:
    using OptionalRef=boost::optional<const T&>;
    explicit MRUSet(bool accessOrder=false, std::size_t maxSize=SIZE_MAX);
    OptionalRef Get(const T& item);
    bool Put(const T& item);
    bool Erase(const T& item);
    void Clear( );
    size_t MaxSize( ) const;
};

A blocking queue may be a thread-safe queue that blocks when popping until there is an entry. The structure of the blocking queue may be of the form:
    template <typename T>
    class BlockingQueue
    {
    public:
        T Pop( );
        void Push(const T& item);
        void Push(T&& item);
        template<class . . . Args>
        void Emplace(Args&& . . . args);
    };

An active object helper may be a utility class for creating active objects from regular classes. An interface for the active object helper may be of the form:
    class Active
    {
    public:
        using Message=std::function<void( )>;
        Active(ThreadPriority_t    ePriority,    const char*szName);
        Active(const Active&)=delete;
        Active& operator=(const Active&)=delete;
        Active(Active&&)=delete;
        Active& operator=(Active&&)=delete;
        ~Active( );
        void Send(Message message);
        void Shutdown( );
        template<class Fn, class . . . Args>
        auto Connect(Fn&& fn, Args&& . . . args)→std:: future<decltype(std::bind(std::forward<Fn>(f    n), std::forward<Args>(args) . . . )( ))>;
    };

A class for creating a thread pool that can be sent functions to run may be of the form:
    class ThreadPool
    {
    public:
        using Message=std::function<void( )>;
        ThreadPool(size_t uMaxThreads, ThreadPriority_t ePriority, const char*szPrefix);
        ThreadPool(const ThreadPool&)=delete;
        ThreadPool& operator=(const ThreadPool&)=delete;
        ThreadPool(ThreadPool&&)=delete;
        ThreadPool& operator=(ThreadPool&&)=delete;
        ~ThreadPool( );
        bool    Send(Message    message,    bool bSpeculative=false);
        void Shutdown( );
    };

Other methods in the system of the present discloser may include a method for querying the number of idle threads to make it assist in adding speculative fetches when there are idle threads available. A blocking queue may be used to launch up to a maximum number of threads for processing messages. Each thread may pop a message from the queue, which may block until there is a message for it to process. The blocking queue may be shut down by sending a "done" message for each thread running.

Figure 5:
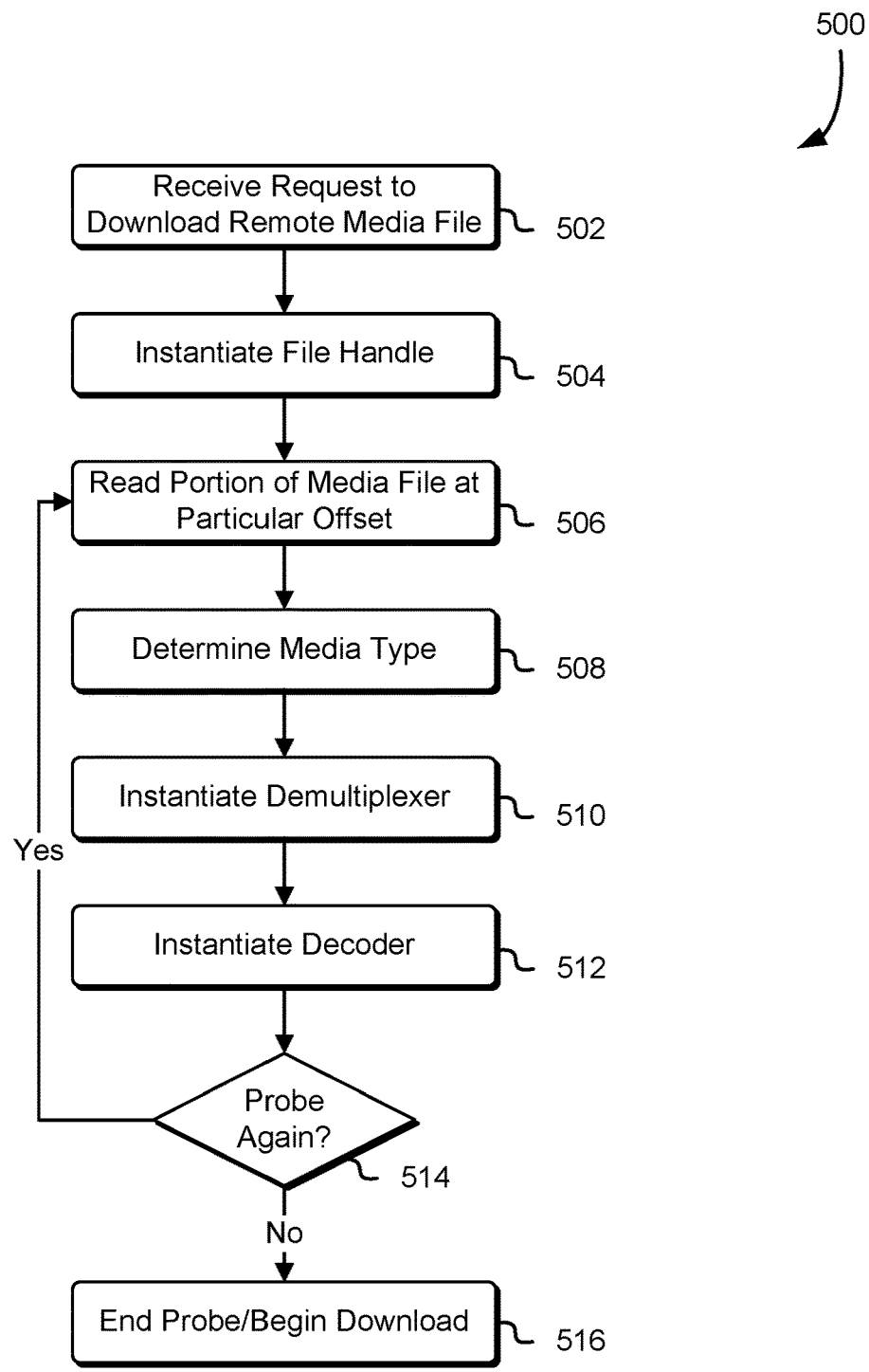
FIG. 5 is a flowchart that illustrates an example of probing a file in accordance with an embodiment.

FIG. 5 is a flowchart illustrating an example of a process 500 for probing a file from its file storage location in accordance with various embodiments. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 9:
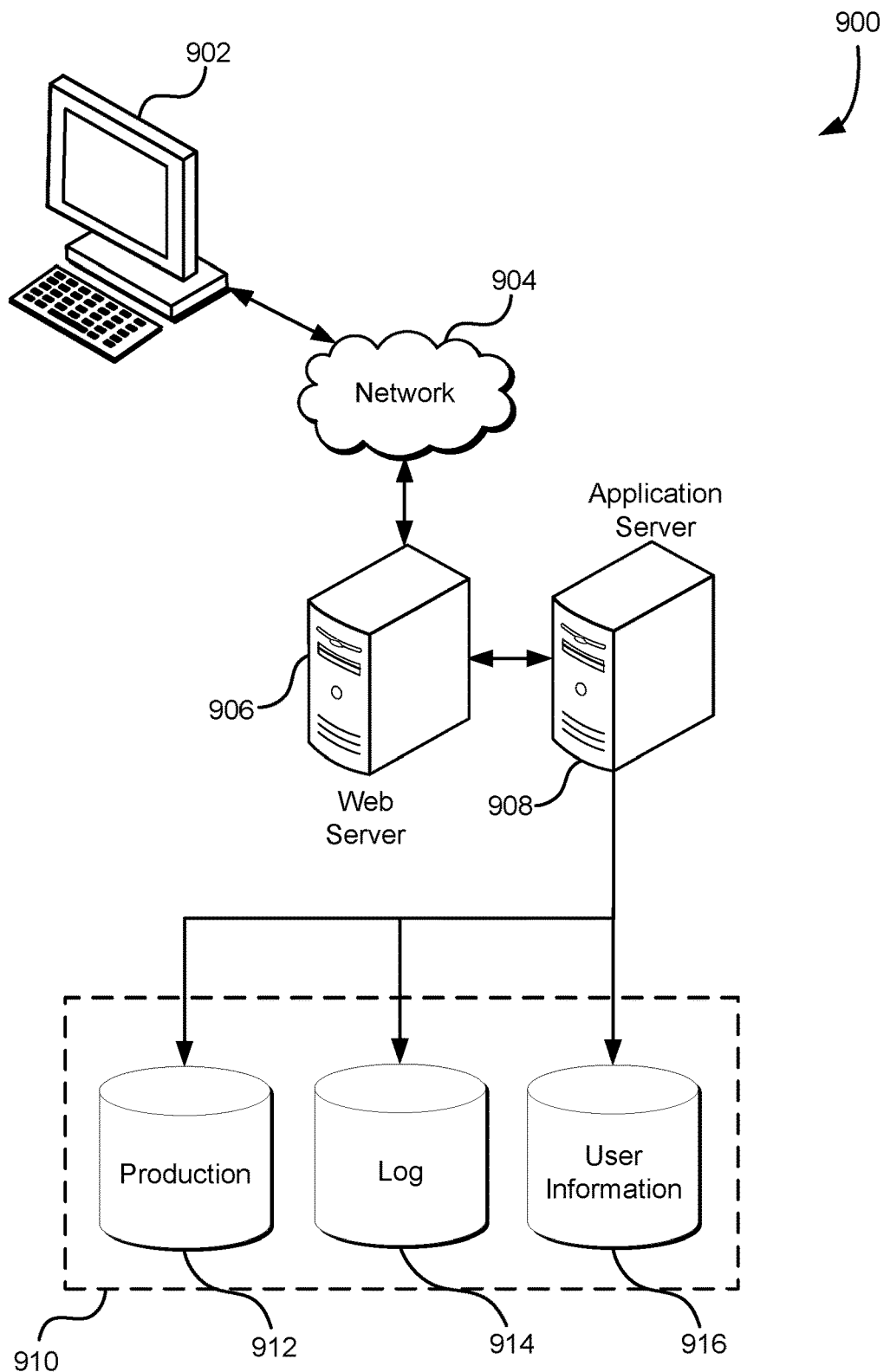
FIG. 9 illustrates an environment in which various embodiments can be implemented.

For example, some or all of process 500 may be performed by any suitable system, such as a server in a data center, by various components of the environment 900 described in conjunction with FIG. 9, such as the web server 906 or the application server 908, by multiple computing devices in a distributed system of a computing resource service provider, or by any electronic client device such as the electronic client device 902. The process 500 includes a series of operations wherein a request for media is received, a file handle is instantiated to access the file, a portion of the file is read in order to determine the type of content contained in the file, a demultiplexer and transcoder are instantiated, and the process repeats until a condition is satisfied.

Thus, in 502, a request is received, such as from an electronic computing device, for content located in a file storage location. In 504, a file handle, such as InputData( ) described in the present disclosure, may be instantiated to access the file; the file handle instance may be configured to access a file stored at a specified uniform resource identifier location. However, before the system provides the content of the file to the requestor, the system may first determine the type of content stored within the file and whether or which types of transcoding algorithms should be loaded. For example, if the system is requesting a video file and/or associated audio, the system may determine the manner in which the file is stored (e.g., whether the video is interleaved with audio, other video, other metadata, etc.), whether the video and/or associated audio is compressed, and which algorithm is needed to decompress the video and/or associated audio.

To this end, in 506, the system may read a portion of the file (i.e., a sample of the content) for analysis, starting from a particular offset up to a predetermined size. In some cases, an initial sample of the content may begin at an offset of zero. In other cases, the offset may be determined according to a stochastic scheme or a fixed scheme (e.g., at a point twenty percent into the file). Additionally or alternatively, in some implementations locations in the file specific to certain content types may be probed (e.g., certain locations in a file that, should the file be of a certain type, such as an MP4 file, would contain information identifying the file as that type). Thereafter, if the system returns to 506 based on the determination of 514, the offset may, depending on implementation, be determined stochastically, according to a fixed scheme, or may be a sample of the content sequential to the previously obtained sample.

In 508, the system may analyze the obtained sample and determine the type of content contained within the sample. The system may be configured to compare or analyze the file to see whether it matches certain criteria that identifies the type of content. For example, the obtained sample may contain information that matches criteria that identifies it as video content. Alternatively, the obtained sample may contain information that matches criteria that identifies it as audio content. Still alternatively, the obtained sample may contain some information matching video content and other information matching audio content, may contain some information matching multiple audio contents or multiple video contents, or any combination of contents described in the present disclosure.

Based at least in part on the determined content, in 510, if needed, the system may instantiate executable code configured to de-multiplex (i.e., extract information specific to the type of content from obtained data) different types of content from data downloaded from the specified file. For example, if the system determines that the file contains transport stream content, the system may instantiate a transport stream demultiplexer. Likewise, if the system determines that the file contains MP4 content, the system may instantiate an MP4 demultiplexer. It is contemplated that those in the art would understand how to determine whether content contains particular media. For example, for transport stream content, the data may be parsed until a transport stream program association table is identified. For MP4 content, tables and certain positions in the file may be scraped for information identifying the content as MP4 content. Likewise, in 512, the system may instantiate executable code for decoding/un-compressing the type of content. For example, if the system determines that the file contains H.264 video, the system can instantiate an H.264 decoder in preparation for decoding the H.264 video.

In 514, the system performing the process 500 may take another sample of the content of the file. For example, the system may determine in this initial probe to sample five random locations within the file. Alternatively, the system may repeat the operations of 506-14 until no new types of content are detected in a predetermined number (e.g., three, 10, 15, etc.) consecutive samples. Thus, if the system determines another probe is warranted, the system may return to 506. Otherwise, the probe is complete and the system performing the process may proceed to 516 to begin fetching content for the requestor in the manner described in the present disclosure. In some embodiments, caching, in the manner described in reference to FIGS. 2 and 3, is disabled during the probing process.

Note that the process 500 for performing the probe is intended to illustrate one of a variety of possible ways to perform the probe. An alternate embodiment may perform the probe as follows: In 502 a request may be received to download the remote media file, and, in response, between 502 and 504, an initial demultiplexer may be instantiated (rather than at 510). A file handle may be instantiated at 504, and the system performing the process may attempt to demultiplex a portion of the media file at a particular offset in 506. Following the operations at 506 the system may determine whether the media file was correctly demultiplexed. If the media file was incorrectly demultiplexed, the system performing the process may return to the operations between 502 and 504 and instantiate a different demultiplexer. These operations may repeat until a demultiplexer that is able to demultiplex the media file correctly is instantiated. Upon successfully demultiplexing the portion of the media file, the system may proceed to 508 to determine the media type. Determining the media type may include determining the packaging format (e.g., MP3 wrapper, transport stream wrapper, etc.). The system may then proceed to 512 to instantiate the proper decoder. The system may perform the operations of 514 and 516 as described above. Note that one or more of the operations performed in 502-16 may be performed in various orders and combinations, including in parallel.

Figure 6:
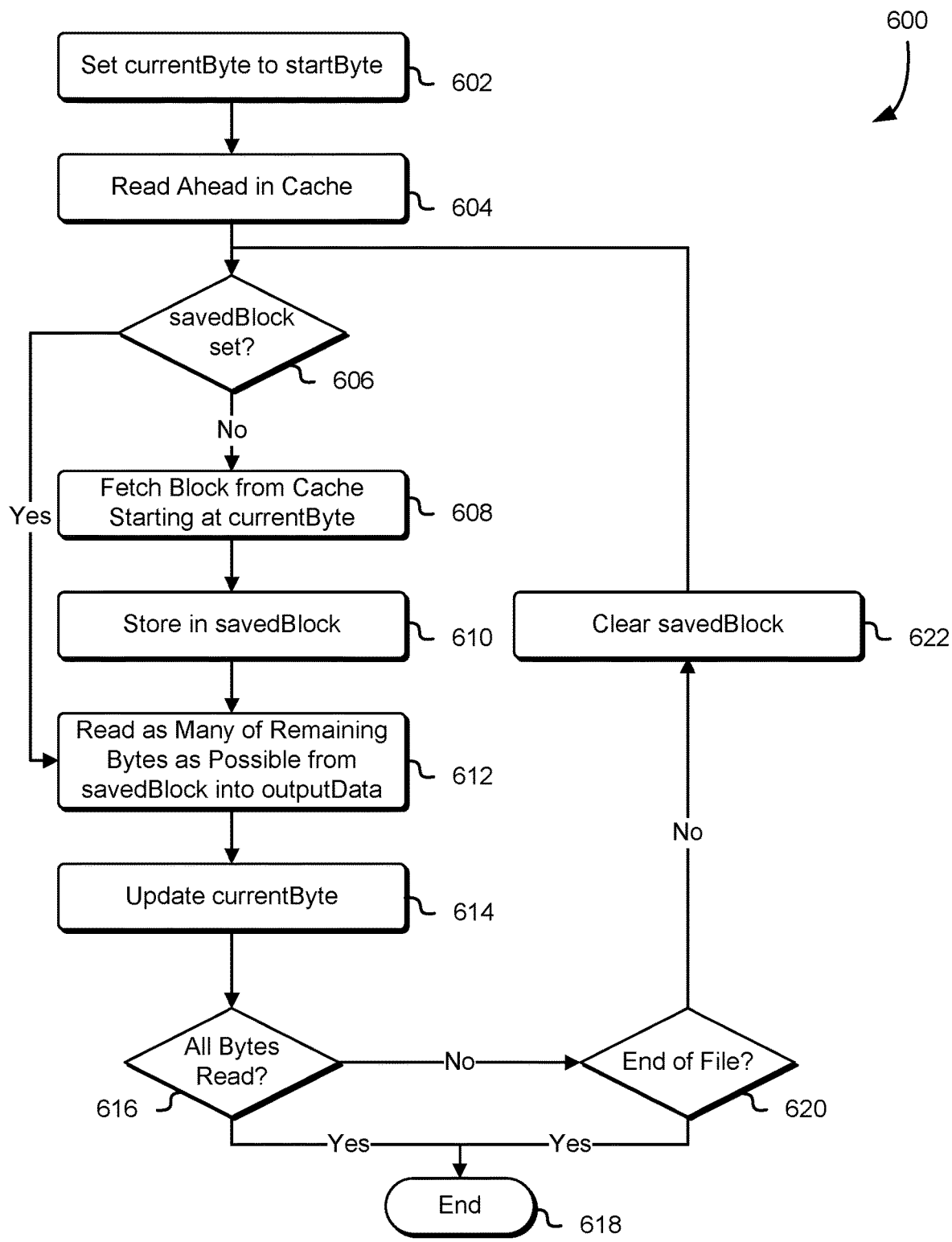
FIG. 6 is a flowchart that illustrates an example of reading blocks of data in accordance with an embodiment.

FIG. 6 is a flowchart illustrating an example of a process 600 for reading blocks in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by any suitable system, such as a server in a data center, by various components of the environment 900 described in conjunction with FIG. 9, such as the web server 906 or the application server 908, by multiple computing devices in a distributed system of a computing resource service provider, or by any electronic client device such as the electronic client device 902. The process 600 includes a series of operations for reading a particular set of data.

The process 600 illustrates a series of operations that may be performed in response to receiving a Read(std::ostream& output, uint64 startByte, uint64 numBytes, int readAheadBlocks), or similar, call, where startByte indicates a starting byte position in the file to be read, numBytes indicates a number of bytes requested to be read, and readAheadBlocks indicates a number of blocks to read ahead in anticipation of receiving requests for those blocks. In embodiments, numBytes may be smaller than a block, larger than a block, or may span a multiple blocks. In 602 a value for the current byte, represented in FIG. 6 by the variable currentByte, of the current block being read may be initially set equal to startByte. In 604, the system may determine how many blocks to read ahead (e.g., readAheadBlocks) into the file cache.

In 606, the system performing the process 600 may determine whether a variable indicating the current block being processed has been set; in the process 600, such variable has been named "savedBlock." In embodiments, Read( ) may be a method of a class, and savedBlock may be a data member of that class. In some embodiments, savedBlock may store a shared pointer to a block returned by the cache. In other embodiments, savedBlock may be an identifier or other value that indicates an identity of the block being fetched. When the class is instantiated, savedBlock may be initially set to a "not set" (e.g., null) value, but in subsequent calls to Read( ) savedBlock may have been set from a previous call to Read( ) Thus, if savedBlock is not set, the system performing the process 600 may proceed to 608. On the other hand, if savedBlock is set, the system performing the process 600 may instead proceed to 612, described below, whereupon the system may read or continue to read bytes from the block indicated by savedBlock into the outputData buffer; skipping operations of 608-10, for retrieving the block indicated by savedBlock, since said block has already been retrieved. In 608, the system performing the process 600 may begin fetching the block corresponding to the value of the currentByte. The operations for fetching the block are described in more detail in FIG. 7. In 610, the variable savedBlock may be set to a pointer or other value that indicates an identity of the fetched block.

In 612, the system performing the process 600 may continue reading as many remaining bytes as possible within a given time or resource availability, up to numBytes, into the output buffer, called "outputData" in FIG. 6. Then, in 614, the variable currentByte may be set to the next byte to be read. In 616, the system performing the process may determine whether all bytes (i.e., all bytes requested in the call to Read( ), from startByte to numBytes) have been read. If so, the system performing the process 600 may proceed to 618, and the process may end with the outputs being the value of outputData and numBytes or a number of bytes that were actually read (e.g., stored in variable numActualBytesRead). Note that the value of savedBlock may, if set, remain set upon a subsequent call of the process 600 (in such a subsequent call, the system, upon reaching 606 may proceed to 612).

However, if all bytes from startByte to numBytes were unable to be read, the system performing the process 600 may proceed to 620, whereupon the system determines whether the reason that numBytes were unable to be read was due to reaching the end of a media file, and if so, the system may proceed to 618 and exit the process in the manner described above. On the other hand, if bytes still remain to be read (i.e., not all bytes read and not at end of file), the system may instead proceed to 622. In 622, the savedBlock variable may be cleared, and the system performing the process 600 may return to 606. In other words, if the reading of 612 reached the end of the current block without reading all the bytes that were requested by the caller (i.e., in the case where the requested data spans one or more block boundaries), the system returns to 606 to fetch the next block to continue reading. Because the savedBlock has now been cleared the system will detect that savedBlock is not set and proceed to 608 and perform the operations described above. Note that one or more of the operations performed in 602-18 may be performed in various orders and combinations, including in parallel.

Figure 7:
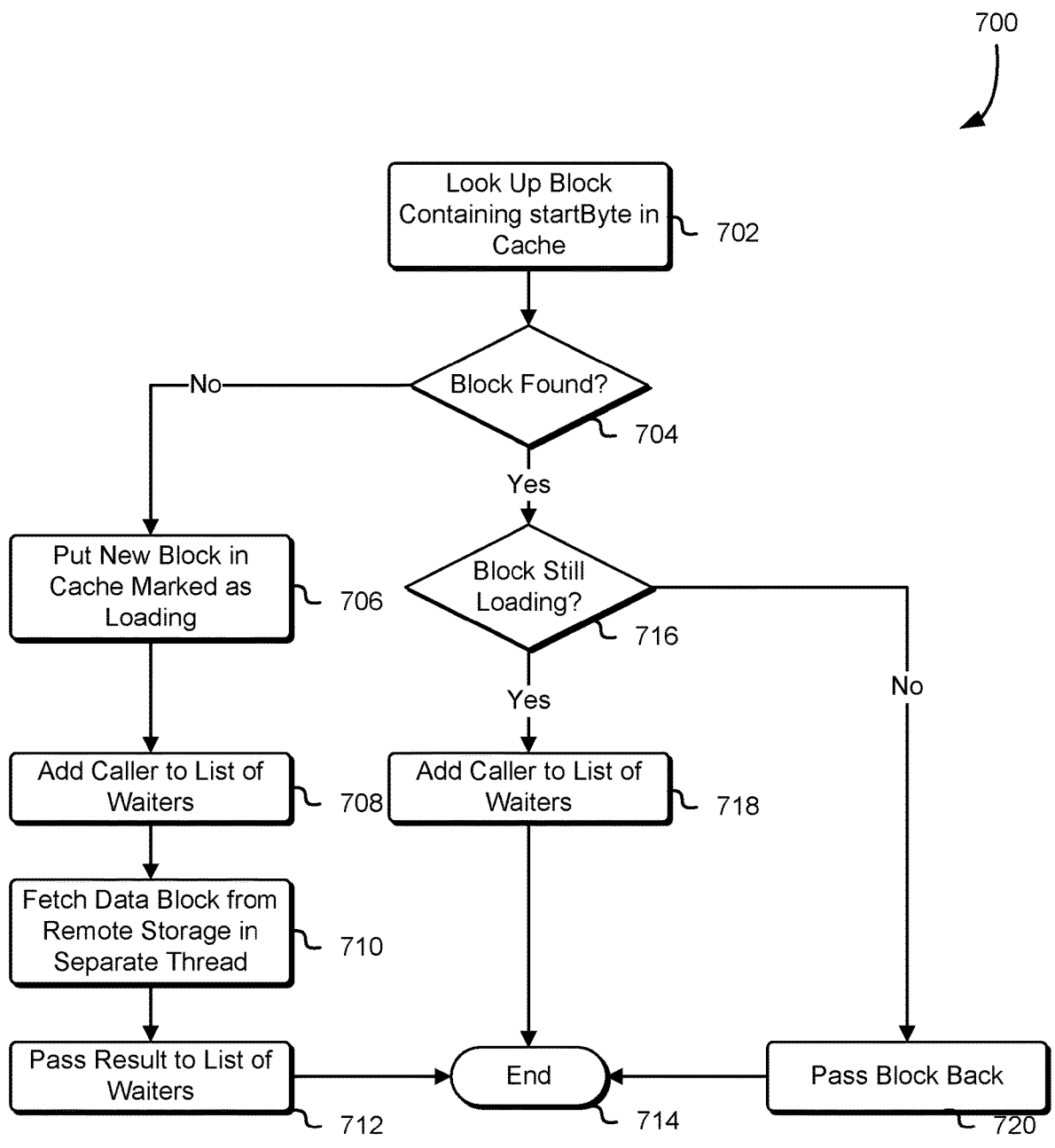
FIG. 7 is a flowchart that illustrates an example of fetching data in accordance with an embodiment.

FIG. 7 is a flowchart illustrating an example of a process 700 for fetching a block in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment 900 described in conjunction with FIG. 9, such as the web server 906 or the application server 908, by multiple computing devices in a distributed system of a computing resource service provider, or by any electronic client device such as the electronic client device 902. The process 700 illustrates in greater detail the operations of 608 of FIG. 6, and includes a series of operations that may be performed in response to receiving a FetchBlock(uint64 startByte), or similar, call, where startByte indicates a starting byte position in the file from which the block is to be fetched.

FetchBlock( ), or similar routine, may be called by InputData( ). As described in the present disclosure, InputData( ) may be an interface, in the sense of an abstract base class, that provides an application programming interface that can effectively serve as a file handle to the media file corresponding to the requested block. Thus, InputData( ) may, transparent to the user, act as a file handle to the media file regardless of whether portions of the media file are in cache, local storage or stored remotely, such as with a data storage service or on a network mount.

In 702, the system performing the process 700 attempts to locate the block associated with the startByte value in local cache. That is, the system determines whether the requested block is a match to a block already stored in the local cache. Note that, in various embodiments, a match does not necessarily require equality. For example, a match may occur if two items correspond to a common object (e.g. value) or are in some predetermined way complementary and/or they satisfy one or more matching criteria. Generally, any way of determining whether there is a match may be used. In some embodiments, blocks are identified based on a uniform resource identifier that corresponds to the media file and a block number. As noted, block size (i.e., size of the block) may be configurable, such as by a user or by a computing resource service provider, but once the file cache is configured for the block, the block size becomes fixed. Thus, when the block is initially fetched, the block number may be generated by dividing the byte offset of the block in its media file by the configured block size. When the block is stored in cache, the uniform resource identifier and the block number may be stored in a table mapping the position of the block in cache (e.g., map 312 of FIG. 3). Thereafter, the uniform resource identifier and the block number may be utilized in conjunction for locating whether the block is in cache. Note that, in some embodiments, block size can be dynamic rather than fixed. In such embodiments, the size of each block may be stored in a mapping table for the blocks.

If, in 704, the block is not found in local cache, the system performing the process 700 may proceed to 706. Otherwise, if the block is found, the system may instead proceed to 716. In 706, the system performing the process 700 may first allocate for the block, mark or otherwise indicate that the block is in the process of being loaded, and then begin downloading the block from the file storage location into the allocated space. An available thread may be caused to download the block by putting a request into a first in, first out buffer (e.g., the second message queue 318 of FIG. 3) for an available thread to start fetching the block. One of the threads in the thread pool (e.g., the threads 308A-08M of FIG. 3) may then take up the request and begin fetching the block.

Because there may be multiple instances (i.e., handles) of InputData( ) attempting to access the same block at the same time, in 708, the caller (i.e., the entity, routine, or thread, that initiated the FetchBlock( ) process 700) may be added to a waiting list for the block. In 710, a thread from a thread pool, such as one of the threads 308A-08M of FIG. 3, may be allocated to fetch the requested block containing startByte, and the thread may cause the block to be fetched from the file storage location. That is, startByte may refer to the starting byte that the caller is requesting to read data from, which may actually be located at any location within the block itself. Once the block has been fetched, in 712, all of the callers (i.e., handles) may be notified that the block is now available, the fetched block may be provided to each of the callers in the list of waiters from the cache. In some implementations, the waiting list may be processed on a first in, first out basis. After all of the callers in the list of waiters have received or been sent the data block, the system performing the process 700 may proceed to 714 and the process 700 may end.

However, if, in 704 the block was found in cache, in 716 the system performing the process 700 may determine whether the block is still being downloaded from the file storage location (e.g., a previous caller requested the same block and perform the operations of 706 to allocate space for the new block and begin loading the new block). That is, at 716 the block could still be being downloaded from the file storage location or the block may be fully downloaded and sitting in the cache. If the block is still being downloaded, the system may proceed to 718, whereupon the caller may be added to the list of waiters for the block, and the system may then proceed to 714, whereupon the process 700 may end. Note that the list of waiters may be shared for all instances requesting the particular block, and that the operations of 718 are only performed if the block is still being downloaded at the request of a previous caller. Thus, the caller that was added to the list of waiters at 718 will receive its notification that its requested block is available when the process 700 initiated by the previous caller performs the operations of 712.

On the other hand, if in 716, the system performing the process 700 detects that the block is already fully downloaded and in cache, the system may proceed to 720 and provide the block to the caller. Then, the system may proceed to 714, whereupon the process 700 may end. In some embodiments, if an instance requests data from a block of a size that is less than the total size of the block, the requested data can be obtained from the cache by the instance once it is available without having to wait for the entire block to be downloaded. In other embodiments, an instance must wait until the entire block is downloaded into the cache before any data from the block may be read.

In some embodiments, if it is determined that the entire block is improbable to be needed in the near future by this and/or other threads, only the data that is needed is downloaded. Thus, in such embodiments, if an instance only requests data located in the middle of a block, the data located in the middle of the block can be retrieved without retrieving the rest of the block. Note that one or more of the operations performed in 702-20 may be performed in various orders and combinations, including in parallel.

Figure 8:
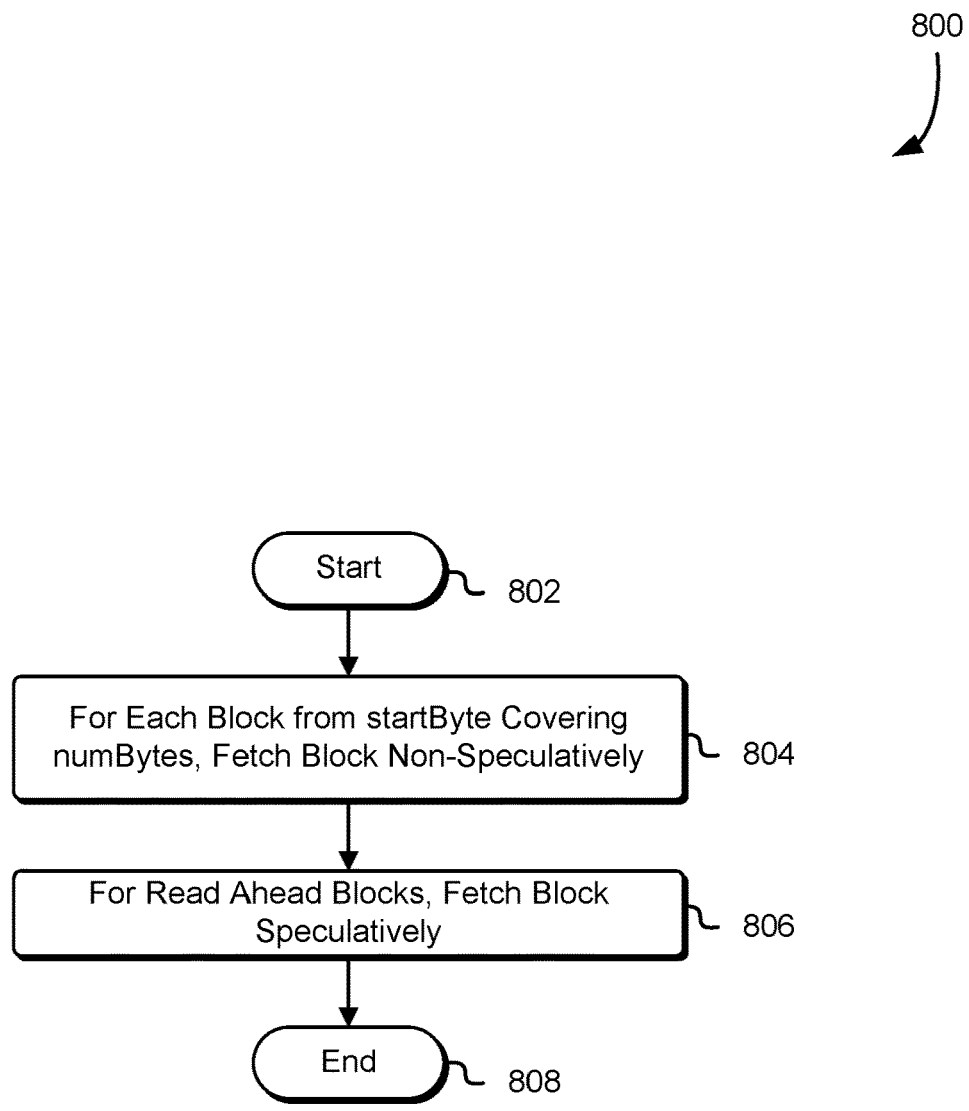
FIG. 8 is a block diagram that illustrates an example of reading ahead in accordance with an embodiment.

FIG. 8 is a block diagram illustrating an example of a process 800 for reading ahead in accordance with various embodiments. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 800 may be performed by any suitable system, such as a server in a data center, by various components of the environment 900 described in conjunction with FIG. 9, such as the web server 906 or the application server 908, by multiple computing devices in a distributed system of a computing resource service provider, or by any electronic client device such as the electronic client device 902.

The process 800 is started at 802 when the file cache receives a request for a particular block. That is, when an instance, such as one of the input data interfaces 304A-04N of FIG. 3, requests data corresponding to a block, the particular block(s) corresponding to the data being requested may be referred to as a non-speculative block. Thus, in 804, each requested (non-speculative) block may be fetched, starting with the block containing startByte, and continuing to fetch blocks until data from startByte up to at least a number of bytes equal to numBytes has been fetched. These blocks may then be stored in cache. In some embodiments, whether to fetch an entire block is determined dynamically; for example, for a first number of times within a certain time period that a read is requested from a particular block of the file, only the requested data is downloaded, rather than the entire block. However, for subsequent read requests within the certain time period from the particular block, then the entire block is downloaded.

In 806, blocks may be read ahead (i.e., fetched speculatively) from each requested block, up to a predetermined number of read-ahead blocks. An example of a call that fetches blocks speculatively may be:

void ReadAhead(const std::string& strURI, uint64 uStartByte, uint64 uNumBytes, unsigned uNumReadAheadBlocks, std::function<std:: unique_ptr<InputData>( )>inputBuilder);

Like the non-speculative blocks, the read-ahead value may be dynamically configurable. The readAheadBlocks value may indicate how many blocks to read past startByte+numBytes. For example, for a first number of times within a certain time period that a read is requested non-speculatively, no blocks may be fetched speculatively. However, for subsequent read requests within the certain time period from the particular block, the read-ahead value would increase in order to fetch blocks speculatively. In some of these embodiments, the read-ahead value can continue to increment (e.g., up to a threshold) the more frequently that the particular block is accessed. In some embodiments, the system performing the process 800 can be configured to detect whether blocks are consistently requested some number of blocks apart. In such embodiments, the read-ahead can be caused to jump forward by that number of blocks in anticipation of a future request. It is contemplated that other machine learning/pattern recognition can be used to predict more complicated access patterns for read-ahead than those described.

The process 800 may end in 808 after the speculative and non-speculative blocks have been fetched. Note that one or more of the operations performed in 802-08 may be performed in various orders and combinations, including in parallel. For example, non-speculative blocks may be fetched in 804 in parallel with fetching speculative blocks in 806.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 904 can include any appropriate network, including an intranet, the Internet, a cellular network, a local area network, a satellite network or any other network and/or combination thereof. Components used for such a system can depend at least in part upon the type of network and/or environment selected. Many protocols and components for communicating via such a network are well known and will not be discussed in detail. Communication over the network 904 can be enabled by wired or wireless connections and combinations thereof. In this example, the network 904 includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes an application server 908 and a data store 910. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 908 can include any appropriate hardware, software and firmware for integrating with the data store 910 as needed to execute aspects of one or more applications for the electronic client device 902, handling some or all of the data access and business logic for an application. The application server 908 may provide access control services in cooperation with the data store 910 and is able to generate content including, text, graphics, audio, video and/or other content usable to be provided to the user, which may be served to the user by the web server 906 in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the electronic client device 902 to provide the content in one or more forms including, forms that are perceptible to the user audibly, visually and/or through other senses. The handling of all requests and responses, as well as the delivery of content between the electronic client device 902 and the application server 908, can be handled by the web server 906 using PHP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store 910 may include mechanisms for storing production data 912 and user information 916, which can be used to serve content for the production side. The data store 910 also is shown to include a mechanism for storing log data 914, which can be used for reporting, analysis or other purposes. It should be understood that there can be many other aspects that may need to be stored in the data store 910, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 908. In one example, a user, through a device operated by the user, might submit a search request for a certain type of item. In this case, the data store 910 might access the user information 916 to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 904 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 904. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems, for instance, may be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   under the control of one or more computer systems that execute instructions,
   in response to receipt of a first request for a first amount of content from a media file stored at a file storage location:
      determining a first block of the content and a second block of the content absent from a local cache;
      producing a first transcoded block by:
         obtaining, using a first thread of a set of threads, the first block from the media file; and
         demultiplexing and transcoding at least a portion of the first block to produce the first amount of content;
      obtaining, using a second thread of the set of threads, the second block from the media file;
      providing the first amount of content in response to the first request;
      storing the second block in a local cache as a cached second block; and
   in response to receiving a second request for a second amount of the content from the media file:
      demultiplexing and transcoding at least a portion of the cached second block from the local cache to produce the second amount of the content; and
      providing the second amount of the content in response to the second request.

2. The computer-implemented method of claim 1, further comprising, in further response to receiving the first request:
   obtaining sample content from the media file;
   demultiplexing the sample content to, at least in part, determine an encoding format associated with at least a portion of the sample content; and
   instantiating a transcoder for transcoding the first block.

3. The computer-implemented method of claim 1, wherein determining the second block of the content is based at least in part on a read-ahead value.

4. The computer-implemented method of claim 3, wherein:
   the first block is of a first block size;
   the second block is of a second block size; and
   one or more of the read-ahead value, the first block size, the second block size, or a size of the local cache are configurable by a user associated with the first request.

5. A system, comprising:
   one or more hardware processors; and
   memory including instructions that, as a result of execution by the one or more hardware processors, cause the system to:
      receive a request, via an interface, for non-speculative data;
      if the non-speculative data is not determined to be present in a local cache:
         determine a first thread; and
         using the first thread, obtain, the non-speculative data from a file storage location;
      if speculative data is absent from the local cache, the speculative data identified based at least in part on the non-speculative data and a read-ahead value:
         determine a second thread from a plurality of threads;
         using the second thread while using the first thread, obtain obtained speculative data corresponding to the speculative data identified; and
         store the obtained speculative data in the local cache; and
      based at least in part on a frequency of requests for data absent from the local cache:
         increase or decrease the read-ahead value, or
         increase or decrease a number of available threads in the plurality of threads.

6. The system of claim 5, wherein the instructions further cause the system to, in response to a second request for second non-speculative data, provide the second non-speculative data from the local cache if the second non-speculative data is in the local cache.

7. The system of claim 5, wherein the instructions further include instructions that further cause the system to, if the non-speculative data is not determined to be present in a local cache, store, in the local cache, the non-speculative data obtained from the file storage location.

8. The system of claim 5, wherein the instructions further include instructions that cause the system to determine one or more of a block size for the non-speculative data or the read-ahead value.

9. The system of claim 5, wherein:
   on a first pass of the data from the file storage location, the non-speculative data is not determined to be present in the local cache; and on a second pass of the data from the file storage location, the non-speculative data and the speculative data are determined to be present in the local cache.

10. The system of claim 5, wherein the local cache operates according to a least recently used policy.

11. The system of claim 5, wherein the non-speculative data is provided without downloading an entire block of the non-speculative data from the file storage location.

12. The system of claim 5, wherein the read-ahead value is dependent at least in part on one or more of:
a media type of the speculative data, or
a bit rate of a type of media in a file at the file storage location from which the speculative data is to be obtained.

13. A non-transitory computer-readable storage medium having stored thereon executable instructions that, as a result of being executed by one or more processors of a computer system, cause the computer system to at least:
download a first set of blocks from a file;
identify, based at least in part on the first set of blocks, a second set of blocks to download from the file;
determine a subset of the second set of blocks that are not in a cache of the computer system; and
for individual blocks in the subset:
assign an available thread from a thread pool to an individual block; and
cause the available thread to download, while other individual blocks of the subset are downloaded, the individual block into the cache of the computer system.

14. The non-transitory computer-readable storage medium of claim 13, wherein blocks of the second set of blocks are of a fixed size that is user-configurable.

15. The non-transitory computer-readable storage medium of claim 13, wherein the executable instructions that cause the computer system to identify the second set of blocks include executable instructions that cause the computer system to identify the second set of blocks based at least in part on a read-ahead value.

16. The non-transitory computer-readable storage medium of claim 13, wherein:
the first set of blocks are of a first media content type;
the second set of blocks are of a second media content type different from the first media content type; and
the executable instructions that cause the computer system to identify the second set of blocks include executable instructions that cause the computer system to identify the second set of blocks based at least in part on the second media content type being synchronized with the first media content type.

17. The non-transitory computer-readable storage medium of claim 13, wherein:
a block of the second set of blocks is interleaved with first data of a first media content type and second data of a second media content type; and
the executable instructions further cause the computer system to provide either the first data or the second data from the cache, depending on a media content type requested.

18. The non-transitory computer-readable storage medium of claim 13, wherein the blocks in the cache are indexed according to uniform resource identifier and block number.

19. The non-transitory computer-readable storage medium of claim 13, wherein the executable instructions further include executable instructions that cause the computer system to provide the block from the cache of the computer system to a requestor.

20. The non-transitory computer-readable storage medium of claim 19, wherein the executable instructions that cause the computer system to provide the set of blocks include executable instructions that cause the computer system to transcode the block from a first format to a second format.

* * * * *